(No Model.)

O. E. ABBEY.
TAG FASTENER.

No. 481,382. Patented Aug. 23, 1892.

WITNESSES
O. B. Baenziger.
E. Wheeler

INVENTOR
O. E. Abbey
By Roscoe B. Wheeler.
atty.

UNITED STATES PATENT OFFICE.

ORRA E. ABBEY, OF DAILEY, MICHIGAN.

TAG-FASTENER.

SPECIFICATION forming part of Letters Patent No. 481,382, dated August 23, 1892.

Application filed October 8, 1891. Serial No. 408,073. (No model.)

*To all whom it may concern:*

Be it known that I, ORRA E. ABBEY, a citizen of the United States, residing at Dailey, in the county of Cass and State of Michigan, have invented certain new and useful Improvements in Tag-Fasteners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in tag-fasteners; and it consists in a certain formation and arrangement of parts, as hereinafter fully set forth, the essential features of the device being pointed out particularly in the claim.

The object of the invention is to provide a fastener that cannot be easily torn from the tag and by means of which the tag may be readily and securely attached to any object. This purpose is attained by the device illustrated in the accompanying drawings, in which—

Figure 1:
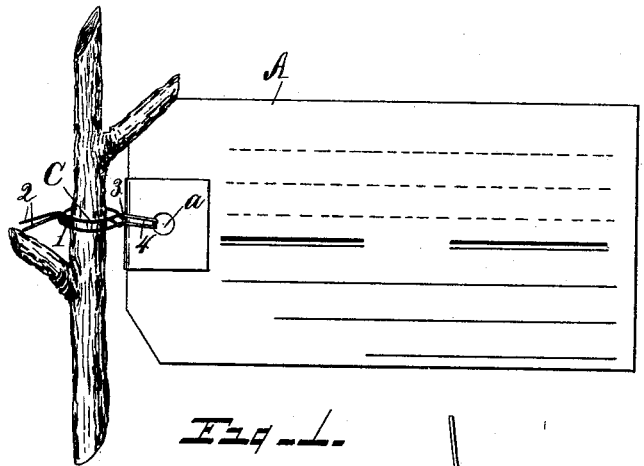
Figures 2, 3:
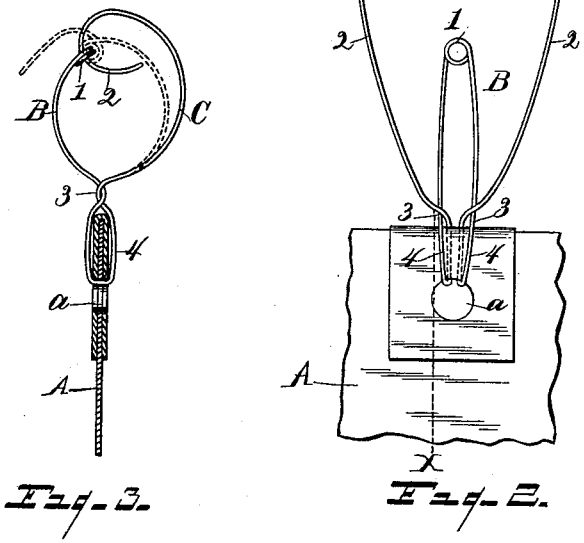

Figure 1 is a view of a tag secured to an object with my improved fastener. Fig. 2 is an enlarged view of the fastener attached to the tag, portions of said tag being broken away. Fig. 3 is a section on dotted line $x$ of Fig. 2, showing the position of the fastener prior to securing the tag to an object.

Referring to the letters and figures of reference, A indicates an ordinary tag having the eye $a$ therein.

My improved tag-fastener is made of a single strand of wire, which is bent around at its longitudinal center and upon itself, forming a loop B, with an eye 1 at its end. (See Fig. 2.) This fastener, so formed, may then be secured to the tag by passing the loop B of the doubled wire through the eye $a$ in the tag, then bending the doubled wire together and passing the free ends 2 2 thereof through the loop B at the end of the tag and bending them back on the outside of said loop, which is drawn between said wires in the opposite direction, (see Fig. 3,) thereby twisting the wires together, as shown at 3, and forming a double loop 4, that incloses that portion of the tag between the eye $a$ and the end thereof, as clearly shown in Figs. 2 and 3. The tag may then be attached to an object by bending the loop B and the free ends of the wire around said object from opposite directions and passing the free ends 2 2 of the wire through the eye 1 of the loop B and bending them back, as shown in Fig. 1 and by dotted lines in Fig. 3, thereby forming the loop C, that encircles the object and securely fastens the tag thereto.

This improved tag-fastener is made of small wire to enable its being readily bent and tied, and by forming a double loop that secures it to the tag it is prevented from being easily torn therefrom, which features make it especially efficacious for tagging small trees or like articles to be shipped, and by employing a staple to be driven into the end of a log or timber this tag-fastener may be used for marking or tagging logs or lumber in shipment.

Having thus fully set forth my invention, what I claim as new, and desire to secure by Letters Patent, is—

In combination with a tag having an eye $a$, a wire fastening device made up of a single piece, which is bent upon itself to form a closed eye 1, the members 3, which extend from the eye 1, being passed through the eye of the tag so as to form a double loop, which engages with the members beyond the edge of the tag, the terminal members 2 being adapted to be passed through the eye 1 and bent to be held in engagement therewith to secure the tag to an object, substantially as shown.

In testimony whereof I affix my signature in presence of two witnesses.

ORRA E. ABBEY.

Witnesses:
J. FRANK GREENAWALT,
JAMES G. HAYDEN.